(12) United States Patent
Furuhata et al.

(10) Patent No.: US 7,909,925 B2
(45) Date of Patent: Mar. 22, 2011

(54) PENETRATION INHIBITOR, METHOD FOR PREVENTING PENETRATION OF SOLVENT INK, SOLVENT INK FOR INJKET PRINTER AND METHOD FOR PRODUCING THE SOLVENT INK

(75) Inventors: Tomotaka Furuhata, Tomi (JP); Satoshi Takezawa, Tomi (JP); Isao Tabayashi, Tomi (JP)

(73) Assignee: Mimaki Engineering Co., Ltd., Nagano (JP)

(*) Notice: Subject to any disclaimer, the term of this patent is extended or adjusted under 35 U.S.C. 154(b) by 271 days.

(21) Appl. No.: 11/851,959

(22) Filed: Sep. 7, 2007

(65) Prior Publication Data
US 2008/0281043 A1    Nov. 13, 2008

(30) Foreign Application Priority Data
Oct. 12, 2006   (JP) ................................ 2006-278990

(51) Int. Cl.
C09D 11/00    (2006.01)
(52) U.S. Cl. ................................ 106/31.41; 106/31.71
(58) Field of Classification Search ................ 106/31.41, 106/31.73
See application file for complete search history.

(56) References Cited

U.S. PATENT DOCUMENTS

| | | | | |
|---|---|---|---|---|
| 5,902,389 A | * | 5/1999 | Jordan | 106/31.41 |
| 6,117,221 A | * | 9/2000 | Nagashima et al. | 106/31.26 |
| 6,632,859 B1 | * | 10/2003 | Jones et al. | 523/160 |
| 2004/0214919 A1 | | 10/2004 | Ikeda et al. | |

FOREIGN PATENT DOCUMENTS

| | | | |
|---|---|---|---|
| JP | 6-240192 | | 8/1994 |
| JP | 10-140060 | | 5/1998 |
| JP | 10-195356 | | 7/1998 |
| JP | 11166147 A | * | 6/1999 |
| JP | 11334234 A | * | 12/1999 |
| JP | 2000212492 A | * | 8/2000 |
| JP | 2000281954 A | * | 10/2000 |
| JP | 2001-311023 | | 11/2001 |
| JP | 2002322411 A | * | 11/2002 |
| JP | 2004-224910 | | 8/2004 |
| JP | 2005036151 A | * | 2/2005 |

OTHER PUBLICATIONS

Machine English Translation of JP 2005-036151.*

* cited by examiner

*Primary Examiner* — Jerry Lorengo
*Assistant Examiner* — Veronica Faison Gee
(74) *Attorney, Agent, or Firm* — Ditthavong Mori & Steiner, P.C.

(57) ABSTRACT

A penetration inhibitor includes a rosin-series resin having weight-average molecular weight of at least about 16,000 and at most about 50,000. The penetration inhibitor is to be added to a solvent ink for an inkjet printer.

14 Claims, 5 Drawing Sheets

PENETRATION INHIBITOR, METHOD FOR PREVENTING PENETRATION OF SOLVENT INK, SOLVENT INK FOR INJKET PRINTER AND METHOD FOR PRODUCING THE SOLVENT INK

CROSS-REFERENCE TO RELATED APPLICATIONS

The present application claims priority under 35 U.S.C. §119 to Japanese Patent Application No. 2006-278990, filed Oct. 12, 2006, entitled "PENETRATION INHIBITOR, METHOD FOR PREVENTING PENETRATION AND SOLVENT INK." The contents of this application are incorporated herein by reference in their entirety.

BACKGROUND OF THE INVENTION

1. Field of the Invention

The present invention relates to a penetration inhibitor, a method for preventing penetration of solvent ink into a print medium, solvent ink for an inkjet printer, and a method for producing solvent ink for an inkjet printer.

2. Discussion of the Background

Inkjet printing using such a solvent ink is widely used in printing for signs such as advertising displays and large-sized posters. Generally, solvent ink includes organic solvent (for example, a glycol ether compound or cyclohexanone) as a main component and further includes a colorant such as dye or pigment and a binder resin.

In the inkjet printing using the solvent ink, a printed matter is obtained in the following manner. First, the solvent ink is ejected from an inkjet head and is deposited on a print medium to form an image. The solvent in the solvent ink deposited on the print medium is absorbed in the print medium or removed from the printed surface by heating the print medium. Consequently, dried ink adheres tightly to the printed surface to form an ink coating, thereby obtaining the printed matter.

As print media used for the inkjet printing using the solvent ink, PVC sheets and tarpaulins having relatively high solvent-absorption property have been typically used. Recently, in addition to these print media, print media having hydrophilic porous print surface such as ink-jet print paper and offset printing plate member are also used for the inkjet printing using the solvent ink.

As the solvent ink used in the inkjet printing, for example, Japanese Unexamined Patent Application Publication No. 2001-311023 discloses a solvent ink containing resin particles, Japanese Unexamined Patent Application Publication No. 2004-224910 discloses a solvent ink containing hydrophobic polymer of which glass transition temperature (Tg) is 40° C. or more, Japanese Unexamined Patent Application Publication Nos. JP-A-6-240192, JP-A-10-140060 and JP-A-10-195356 disclose solvent inks containing predetermined resins. The contents of these publications are incorporated by reference in their entirety.

However, the solvent inks disclosed in these publications have the following problems. That is, there is a problem that ink bleed easily occurs in the obtained image when the aforementioned conventional solvent ink is used to perform inkjet printing onto a print medium having a hydrophilic porous print surface to be printed on because such print medium has low solvent absorbency and the ink thus penetrates into the print medium.

When inkjet printing is performed to an offset printing plate member by using the aforementioned conventional solvent ink, the ink penetrates into the print medium so as to reduce the amount of ink coating formed on the printed surface. Accordingly, the ink coating on the obtained offset plate has insufficient water resistance and insufficient water repellency. When this offset plate with the insufficient amount of ink coating is used for the offset printing, the adhesion of ink for offset printing relative to the offset plate is poor, that is, there is a problem that sufficient plate life is not obtained.

For the purpose of achieving the aforementioned object, the present invention provides a penetration inhibitor, to be added to an inkjet solvent ink for preventing the penetration of the solvent ink into a print medium, comprising a rosin-series resin of which weight-average molecular weight is from 16,000 to 50,000.

Using the penetration inhibitor of the present invention, there is provided a solvent ink which can be efficiently prevented from penetrating into a print medium even when the inkjet printing is performed to the print medium having a hydrophilic porous surface.

According to the solvent ink containing the penetration inhibitor of the present invention, when inkjet printing is performed to a plate member for offset printing, the penetration of ink into the plate member is prevented so that the amount of an ink coating formed on the print surface of the plate member is increased. Accordingly, an offset printing plate with the ink coating having sufficient water resistance and water repellency can be obtained. When the offset printing plate is used for offset printing, sufficient adhesion of ink for offset printing relative to the offset printing plate can be obtained. Accordingly, the offset printing plate has excellent plate life.

SUMMARY OF THE INVENTION

According to one aspect of the present invention, a penetration inhibitor includes a rosin-series resin having weight-average molecular weight of at least about 16,000 and at most about 50,000. The penetration inhibitor is to be added to a solvent ink for an inkjet printer.

According to another aspect of the present invention, a method for preventing penetration of solvent ink into a print medium includes adding a rosin-series resin having weight-average molecular weight of at least about 16,000 and at most about 50,000 into the solvent ink for an inkjet printer.

According to further aspect of the present invention, solvent ink for an inkjet printer includes a solvent and a penetration inhibitor which includes a rosin-series resin having weight-average molecular weight of at least about 16,000 and at most about 50,000.

According to the other aspect of the present invention, a method for producing solvent ink for an inkjet printer includes providing a solvent and adding a rosin-series resin having weight-average molecular weight of at least about 16,000 and at most about 50,000 into the solvent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Though preferred embodiments of the present invention will be described in detail, the present invention is not limited to the following embodiments.

(Penetration Inhibitor)

A penetration inhibitor according to an embodiment of the present invention, to be contained in an inkjet solvent ink for preventing the penetration of the inkjet solvent ink into a print medium, includes a rosin-series resin.

Rosin-series resins mean rosin modified resins. Examples include rosin ester resins, rosin modified phenolic resins, rosin modified maleic resins, and rosin modified alkyd resin. Among these, the rosin modified phenolic resin is particularly preferable because of excellent solubility relative to a typically used solvent for the solvent ink and ejection stability of the solvent ink. Using the rosin modified phenolic resin makes the ink to highly exhibit the penetration inhibiting effect relative to the print medium.

Though the reason why the aforementioned effects can be obtained by the penetration inhibitor according to an embodiment of the present invention is not so clear, the inventors of this invention consider as follows.

That is, there is an ink absorptive layer on a print medium, having a hydrophilic porous surface to be printed on, such as an inkjet paper and an offset printing plate member. In the ink absorptive layer, hydrophilic inorganic particles such as silicon dioxide or aluminum oxide are dispersed in hydrophilic resin such as polyvinyl alcohol.

When the affinity between the resin in the solvent ink and the ink absorptive layer is excessively high, the resin penetrates into the ink absorptive layer not to allow a sufficient amount of resin to remain on the printing surface so that the amount of the obtained ink coating is insufficient. On the other hand, when the affinity between the resin in the solvent ink and the ink absorptive layer is low, adhesion of ink to the print medium can not be obtained.

However, since the penetration inhibitor according to an embodiment of the present invention has a suitable affinity to hydrophilic inorganic particles and hydrophilic resins, it is believed that strong adhesion of ink to the print medium can be obtained and the penetration into the print medium can be prevented.

The rosin-series resin is preferably a rosin-modified phenolic resin. Accordingly, the penetration inhibiting effect of the penetration inhibitor according to an embodiment of the present invention relative to the print medium is improved.

The print medium is preferably a print medium having a hydrophilic porous surface to be printed on, particularly, a plate member for offset printing. According to the print medium as mentioned above, the penetration inhibiting effect is achieved at a higher level.

The present invention also provides a penetration inhibiting method, for preventing the penetration of an inkjet solvent ink into a print medium, which comprises adding a rosin-series resin, of which weight-average molecular weight is from 16,000 to 50,000, into the inkjet solvent ink.

The penetration inhibiting method according to an embodiment of the present invention can exhibit excellent penetration inhibiting effect because the aforementioned penetration inhibitor, that is, a rosin-series resin of which the weight-average molecular weight is from 16,000 to 50,000 is used.

In the penetration inhibiting method according to an embodiment of the present invention, it is preferable that only said rosin-series resin is contained as a polymer resin component into the inkjet solvent ink. Accordingly, the content of the polymer resin component can be relatively reduced as a whole so as to lower the viscosity of the solvent ink, thereby improving the ejection stability of the solvent ink.

In the penetration inhibiting method according to an embodiment of the present invention, it is preferable that the rosin-series resin is contained in the inkjet solvent ink in an amount of from 5 to 25% by mass relative to the total amount of the solvent ink. In case that the content of the rosin-series resin is less than 5% by mass relative to the total amount of the solvent ink, the obtained penetration inhibiting effect is lower than that in case that the content is in the aforementioned range. On the other hand, in case that the content of the rosin-series resin is more than 25% by mass relative to the total amount of the solvent ink, the viscosity of the obtained solvent ink is higher than that in case that the content is in the aforementioned range, thus reducing the ejection stability.

An inkjet solvent ink according to an embodiment of the present invention contains, as a polymer resin component, only a penetration inhibitor as described above. Even when inkjet printing is performed to an inexpensive inkjet paper using this inkjet solvent ink, obtained image has less ink bleed because of the penetration inhibiting effect.

The weight-average molecular weight of the rosin-series resin is at least about 16,000 and at most about 50,000, preferably at least about 25,000 and at most about 40,000. In case that the weight-average molecular weight of the rosin-series resin is less than about 16,000, the penetration inhibiting effect is insufficient. On the other hand, in case that the weight-average molecular weight of the rosin-series resin is more than about 50,000, the ejection stability of ink from the inkjet head is poor. In case of especially poor ejection stability, printing error due to nozzle clogging may be caused. It should be noted that the weight-average molecular weight used in this specification is weight-average molecular weight (Mw) with reference to polystyrene standard which are measured by using a GPC (gel permeation chromatography) analyzer (HLC-8220GPC available from Tosoh Corporation) equipped with (two) columns of Shodex KF-800D and KF-805L and using THF (tetraphdrofuran) as the eluting solvent.

The penetration inhibitor is preferably contained in an amount of at least about 5% and at most about 25% by mass, more preferably at least about 10% and at most about 20% by mass with respect to the total amount of the solvent ink. In case that the amount of the penetration inhibitor is less than about 5% by mass relative to the total amount of the solvent ink, the aforementioned penetration inhibiting effect is deteriorated as compared to the case in the aforementioned range. In case that the amount of the penetration inhibitor is more than about 25% by mass relative to the total amount of the solvent ink, the viscosity of the solvent ink is increased and the ejection stability is thus deteriorated as compared to the case in the aforementioned range.

The penetration inhibitor is preferably used as a component of the inkjet solvent ink, not used together with any polymer resin component other than the aforementioned rosin-series resin. However, if necessary, the penetration inhibitor may be used together with a polymer resin component other than the aforementioned rosin-series resin. The polymer resin used together with the penetration inhibitor is preferably a nonbridging resin of which molecular weight is 50,000 or less in the light of the ejection stability for inkjet. Examples as the resin include (styrene) acrylic resins, epoxy resins, polyester resins, modified and/or non-modified olefin resins, silicone resins, urethane resins, terpene resins, petroleum resins, polyamide resins, and cellulose.

In case of also using such polymer resin component, the amount of the polymer resin component is preferably contained in an amount of from 0.01 to 15% by mass relative to the total amount of the solvent ink.

The aforementioned penetration inhibitor can be added to an inkjet solvent ink of an embodiment as will be described below, for example.

(Penetration Inhibiting Method)

The penetration inhibiting method according to an embodiment of the present invention is a penetration inhibiting method for preventing penetration of inkjet solvent ink into a print medium, which includes containing a rosin-series resin of which weight-average molecular weight is at least about 16,000 and at most about 50,000 into the ink for inkjet printing.

The print medium in the penetration inhibiting method of the present invention is not limited particularly. In case that an offset printing plate member is used as the print medium, notable effects are obtained for the following reasons.

That is, an offset printing plate having a hydrophilic surface and a hydrophobic surface on its outer surfaces is used in offset printing. Ink is deposited only on the hydrophobic surface and not on the hydrophilic surface. In this state, the ink deposited only on the hydrophobic surface is transferred indirectly to a print medium, thereby obtaining a printed matter.

In case that inkjet printing is performed to the offset printing plate member to form an offset printing plate, an ink coating formed by the printing corresponds to the hydrophobic surface and the other portion corresponds to the hydrophilic surface. If the ink penetrates into the print medium, the amount of ink coating formed on the printed surface is reduced, with the result that the ink coating has insufficient water resistance and insufficient water repellency. When this offset printing plate with the insufficient amount of ink coating is used for the offset printing, the adhesion of ink for offset printing relative to the offset printing plate is poor. Since the amount of the ink coating is insufficient, the offset printing plate is undurable (has short plate life) when being repeatedly used for printing.

By using the penetration inhibiting method according to an embodiment of the present invention, however, the ink can be prevented from penetrating into the printing plate member, thereby obtaining an offset printing plate with sufficient water resistance and water repellency of the ink coating. In case that the offset printing plate is used for the offset printing, sufficient adhesion of ink for offset printing relative to the offset printing plate can be obtained. Since the ink coating has sufficient water resistance and water repellency, the offset printing plate has excellent plate life.

(Solvent Ink)

The inkjet solvent ink of this embodiment contains the aforementioned penetration inhibitor and a solvent. Preferably, contained as a polymer resin component in the solvent ink is only a penetration inhibitor. The polymer resin component means a component of which weight-average molecular weight measured by the aforementioned GPC analyzer is about 8,000 or more (preferably about 10,000 or more, more preferably about 15,000 or more).

Examples of the solvent include ketones such as acetone, methyl ethyl ketone, cyclohexane, and 2-heptanone; alcohols such as methanol, ethanol, isopropanol, n-hexyl alcohol, iso-heptyl alcohol, 2-ethyl hexyl alcohol, n-octyl alcohol, 3-methyl-3-methoxy butanol, and 3-methoxy butanol; ethers such as cellosolve, and butyl cellosolve; hydrocarbons such as toluene, xylene, turpentine, limonene, industrial volatile oil, tetrahydronaphthalene, and decahydronaphthalene; glycols such as ethylene glycol, diethylene glycol, thiodiethylene glycol, tridiethylene glycol, propylene glycol, dipropylene glycol, and tripropylene glycol; glycol ether acetates such as ethylene glycol monoethyl ether acetate, ethylene glycol monobutyl ether acetate, diethylene glycol monoethyl ether acetate, and diethylene glycol monobutyl ether acetate; glycol ethers such as ethylene glycol monohexyl ether, ethylene glycol-2-ethylhexyl ether, ethylene glycol phenyl ether, propylene glycol monoethyl ether, propylene glycol propyl ether, propylene glycol monobutyl ether, diethylene glycol monomethyl ether, diethylene glycol monoethyl ether, diethylene glycol monobutyl ether, diethylene glycol hexyl ether, diethylene glycol-2-ethyl hexyl ether, dipropylene glycol monomethyl ether, dipropylene glycol monoethyl ether, dipropylene glycol monobutyl ether, dipropylene glycol propyl ether, triethylene glycol monomethyl ether, triethylene glycol monoethyl ether, triethylene glycol monobutyl ether, and tripropylene glycol monomethyl ether; esters such as 2,2,4-trimethyl-1,3-pentanediol monoisobutyrate, triethylene glycol di(2-ethylbutyrate), propylene carbonate, ethyl lactate, butyl lactate, methyl acetoacetate, ethyl acetoacetate, diacid ester (DBE), and 3-methyl-3-methoxy butyl acetate; and pyrrolidones such as N-methyl-2-pyrrolidone, but not particularly limited thereto. These solvents may be used alone or as a mixture of any two or more thereof in consideration of the solubility of used penetration inhibitor, ejection stability of ink, and the drying property of the ink on a medium being printed. The content of the solvent is preferably from 50 to 99% by mass relative to the total amount of the solvent ink.

The solvent ink may contain colorants such as dye and pigment, if necessary. As the colorant, various inorganic and organic dyes and pigments which are generally used in inks for inkjet printing may be used. Examples of dyes include C.I. Pigment Yellow 93, 95, 109, 110, 120, 128, 138, 139, 151, 154, 155, 173, 180, 185, and 193, C.I. Pigment Orange 34, 36, 43, 61, 63, and 71, C.I. Pigment Red 122, and 202, solid solution of C.I. Pigment Red 122 and 202, C.I. Pigment Blue 15:3 and 15:4, C.I. Pigment Violet 19, 23, and 33, C.I. Pigment Black 7, titanium oxide, alumina, zinc oxide, hollow resin fine particles, mica, isinglass, and aluminum fine particles. The particle diameter of pigment is preferably 150 nm or less in the mean particle size from the viewpoint of color density, hue, and ink stability of the ink. On the other hand, examples of dyes include C.I. Solvent Yellow 1, 2, 3, 13, 14, 19, 21, 22, 29, 36, 37, 38, 39, 40, 42, 43, 44, 45, 47, 62, 63, 71, 76, 79, 81, 82, 83:1, 85, 86, 88, and 151; C.I. Solvent Red 8, 27, 35, 36, 37, 38, 39, 40, 49, 58, 60, 65, 69, 81, 83:1, 86, 89, 91, 92, 97, 99, 100, 109, 118, 119, 122, 127, and 218; C.I. Solvent Blue 14, 24, 25, 26, 34, 37, 38, 39, 42, 43, 44, 45, 48, 52, 53, 55, 59, 67, and 70; and C.I. Solvent Black 3, 5, 7, 8, 14, 17, 19, 20, 22, 24, 26, 27, 28, 29, 43, and 45. These colorants may be used alone or as a mixture of two or more thereof. On the other hand, the solvent ink may be used as a transparent ink when containing no dye or pigment. The colorant may be added to ink in a selected amount suitable for desired print density without impairing ejection stability of the ink. The content of the colorant in ink is preferably from 0.1 to 15% by mass relative to the total amount of the solvent ink.

The solvent ink according to an embodiment of the present invention may contain additives other than the aforementioned components, for example, conductivity adjusters, surfactants. ultraviolet absorbers, antifoam agents, and antioxidants.

Examples of conductivity adjusters include carbons and ionic compounds. In case of containing such a conductivity adjuster, the content of the adjuster is preferably from 0.01 to 5% by mass relative to the total amount of the solvent ink.

Examples of surfactants include polyoxyethylene alkyl ether compounds, polyoxyethylene sorbitan compounds, and perfluoroalkyl ethylene compounds. In case of containing such a surfactant, the content of the surfactant is preferably from 0.01 to 3% by mass relative to the total amount of the solvent ink.

Examples of ultraviolet absorbers include benzotriazole compounds, hindered amine compounds, and hydroxyphenyl triazine compounds. In case of containing such an ultraviolet absorber, the content of the ultraviolet absorber is preferably from 0.01 to 8% by mass relative to the total amount of the solvent ink.

Examples of antifoam agents include silicone oil, fatty acid ester compounds, and phosphate ester compounds. In case of containing such an antifoam agent, the content of the antifoam agent is preferably from 0.01 to 3% by mass relative to the total amount of the solvent ink.

Examples of antioxidants include phenolic compounds, amine compounds, and phosphate compounds. In case of containing such an antioxidant, the content of the antioxidant is preferably from 0.01 to 3% by mass relative to the total amount of the solvent ink.

As for values for physical properties of the solvent ink according to an embodiment of the present invention, the solvent ink is preferably adjusted to have a viscosity of from 3 to 15 mPa·S and have a surface tension of from about 20 to 35 mN/m. Viscosities used in this specification are values measured by using Digital Viscomate VM-100A (available from Yamaichi Electronics Co., Ltd.) under an environmental temperature of 25° C. Surface tensions are values measured by using a surface tensiometer (available from Kyowa Interface Science Co., Ltd.) of Wilhelmy plate method type under an environmental temperature of 25° C. and an environmental humidity of 50% RH.

It is preferable that the solvent ink according to an embodiment of the present invention is filtered by a filter of which aperture size is from about 0.1 to 10 μm if necessary to remove rough and large particles in the ink before subjected to inkjet printing.

(Print Medium)

The print medium to be subjected to inkjet printing according to an embodiment of the present invention is preferably a print medium having a hydrophilic porous print surface, such as an inkjet paper or an offset printing plate member. Among such print media, a surface printing plate member such as an offset printing plate member is more preferable.

There are various kinds of surface printing plate members according to printing systems. Most of the surface printing plate members are plate members having a photosensitive undercoating layer on a support and a hydrophilic layer on the surface of the photosensitive undercoating layer (see Japanese Unexamined Patent Application Publications No. 2001-105762 and Japanese Unexamined Patent Application Publications No. 2003-255563). As the support of the plate member, a metal sheet such as a steel sheet plated with aluminum or chromium may be employed. As another cheaper support, a water resist support such as a water resistant paper, a plastic film, or a paper laminated with plastic may be employed. The layer thickness of the plate member is preferably from 100 to 300 μm and the thickness of the hydrophilic layer on the surface is preferably from 5 to 30 μm.

For forming a surface printing plate, a method of forming a hydrophilic/hydrophobic plate by exposing the plate member to laser beam according to image information to remove the hydrophilic layer on the exposed portion has been generally employed. On the other hand, a method of forming a hydrophilic/hydrophobic plate by applying a hydrophobic ink to the plate member using the inkjet printing technique can be also employed. According to this method, no laser is required so that a surface printing plate can be obtained by a simple and cheaper device arrangement.

In case of using the solvent ink containing the penetration inhibitor according to an embodiment of the present invention to form a plate using the inkjet printing technique, an ink coating having sufficient water resistance and water repellency is formed on the surface of the plate member. The plate with the ink coating formed thereon can be suitably used as an offset printing plate.

The solvent ink containing the penetration inhibitor according to an embodiment of the present invention can form an ink coating having excellent adhesion even in case of inkjet printing to a non-penetrative printing plate such as a grained aluminum plate. Accordingly, the plate with the ink coating formed thereon can be also suitably used as an offset printing plate.

EXAMPLES

Hereinafter, examples according to an embodiment of the present invention will be described, but the present invention is not limited to the following examples.

Example 1

A mixture of ethylene glycol monobutyl ether acetate and propylene glycol monoethyl ether acetate (4:1 by volume ratio) was prepared as a solvent and C.I. Solvent Black 7 was prepared as a dye. After 80 parts by mass of the solvent, 2 parts by mass of the dye, and 18 parts by mass of a penetration inhibitor shown in the following Table 1 were mixed and solved at a temperature of 45° C., the mixture was filtered by a stainless steel mesh of which aperture size is 2 μm. In this manner, a solvent ink of Example 1 was obtained.

Examples 2, 3

Solvent inks of Examples 2 and 3 were obtained in the same manner as Example 1 except that penetration inhibitors shown in the following Table 1 were used. In Example 3, a mixture of 10 parts by mass of a rosin modified ester and 8 parts by mass of an acrylic resin was used as the penetration inhibitor.

Comparative Examples 1, 2

Solvent inks of Comparative Examples 1 and 2 were obtained in the same manner as Example 1 except that penetration inhibitors shown in the following Table 1 were used.

TABLE 1

|  | Penetration Inhibitor | Molecular weight | Parts by mass |
|---|---|---|---|
| Example 1 | Rosin modified phenolic resin (TAMANOL 414, available from Arakawa Chemical Industries, Ltd) | 40,000 | 18 |
| Example 2 | Rosin modified phenolic resin (TAMANOL 340, available from Arakawa Chemical Industries, Ltd) | 16,000 | 18 |
| Example 3 | Rosin modified phenolic resin (TAMANOL 414, available from Arakawa Chemical Industries, Ltd) | 40,000 | 10 |
|  | Acrylic resin (MMA/BA/2EtHA = 70/20/10) | 30,000 | 8 |
| Comparative Example 1 | Rosin modified ester resin (PENSEL AZ, available from Arakawa Chemical Industries, Ltd) | 2,000 | 18 |
| Comparative Example 2 | Styrene acrylic resin (St/BA/2EtHA = 70/15/15) | 30,000 | 18 |

MMA: methyl methacrylate,
BA: butyl acrylate,
2EtHA: 2-ethylhexyl acrylate,
St: styrene (Evaluation of Solvent Ink)

According to printing tests conducted using the following inkjet printer and print media, the solvent inks of Examples 1 through 3 and Comparative Examples 1, 2 were evaluated.

[Inkjet Printer]

An inkjet printer as a testing machine specialized from an inkjet printer (UJF-605C available from Mimaki Engineering Co., Ltd.) provided with a piezohead was employed. Though the inkjet printer UJF-605C is a UV printer, a UV irradiator thereof was removed for specializing as a testing machine. Printing tests were conducted after the temperature of the inkjet head was set to a temperature of 30° C. and each of the aforementioned inks was filled. Printing was performed with 1200 dpi/16 pass.

[Print Media]

Plate members each of which has an ink absorptive layer and a surface hydrophilic layer formed on its support were used as the print media. The surface hydrophilic layer had a composition in which polyvinyl alcohol is mixed with silica particles.

Evaluation of Solvent Ink of Example 1

Printing was performed to the aforementioned print medium using the aforementioned inkjet printer and the solvent ink of Example 1. The obtained printed matter was dried at a temperature of 100° C. for 1 minute so as to obtain a printing plate member A. The inkjet printing was conducted with no recognizable nozzle aberrations such as nozzle clogging and deflection.

The printing plate member A was observed under an optical microscope (450× magnification), with the result that an ink coating formed on the printing plate member was confirmed. In addition, the water contact angle of a printed portion (printing rate: 100%) was measured (water drop, CA-V available from Kyowa Interface Science Co., Ltd., after 100 msec of contact). As a result, the water contact angle of the printed portion was 92°. This means that the printed portion has high water repellency. On the other hand, the water contact angle of non-printed portion was 20°. Accordingly, the printing plate member A has a strong contrast of hydrophobic/hydrophilic properties between the printed portion and the non-printed portion.

As the offset printing was conducted by a printer Shinohara 52 with Super Tekplus ink using the printing plate member A, 5000 pieces of printed matter were outputted with good dot reproducibility.

Figure 1:
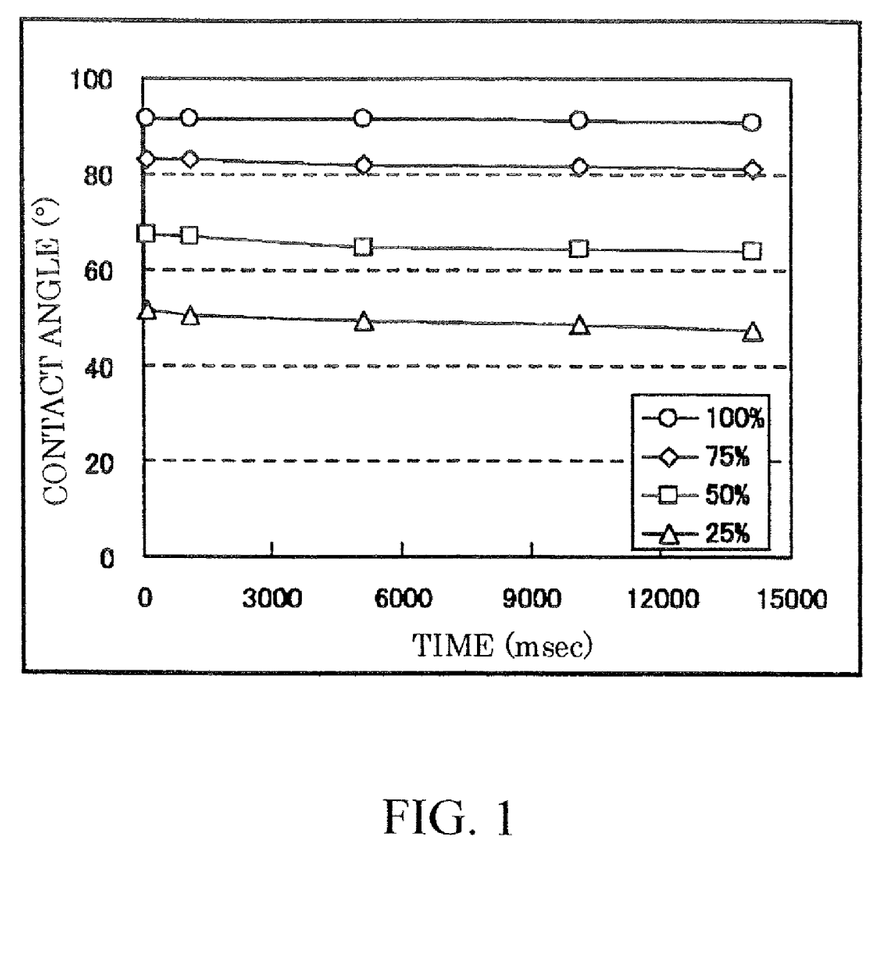
FIG. 1 is a diagram showing a relationship between time and water contact angles on the printing plate member A.

FIG. 1 shows variation with time (through 14,000 msec) of the water contact angles at a portion with 25% printing rate, a portion with 50% printing rate, a portion with 75% printing rate, and a portion with 100% printing rate of the printing plate member A, respectively.

As apparent from FIG. 1, the higher printing rate portion (portion with printing ink adhered thereto) exhibits the higher water repellency, so as to achieve a strong contrast of hydrophobic/hydrophilic properties between the higher printing rate portion and the lower printing rate portion (portion with little or no printing ink adhered thereto). The variation with time of the water contact angle was slight. It was found from this phenomenon that the water repellency of the printing plate member A can be maintained. That is, the ink penetration to the print media can be efficiently prevented.

Evaluation of Solvent Ink of Example 2

A printing plate member B was obtained in the same manner as Example 1 except that the solvent ink of Example 2 was used.

The printing plate member B was observed under the optical microscope (450× magnification), with the result that an ink coating formed on the printing plate member was confirmed. In addition, the water contact angle of a printed portion (printing rate: 100%) was measured, with the result that the water contact angle of the printed portion was 88°.

As the offset printing was conducted in the same manner as Example 1 except that the printing plate member B was used, 5000 pieces of printed matter were outputted with good dot reproducibility.

Figure 2:
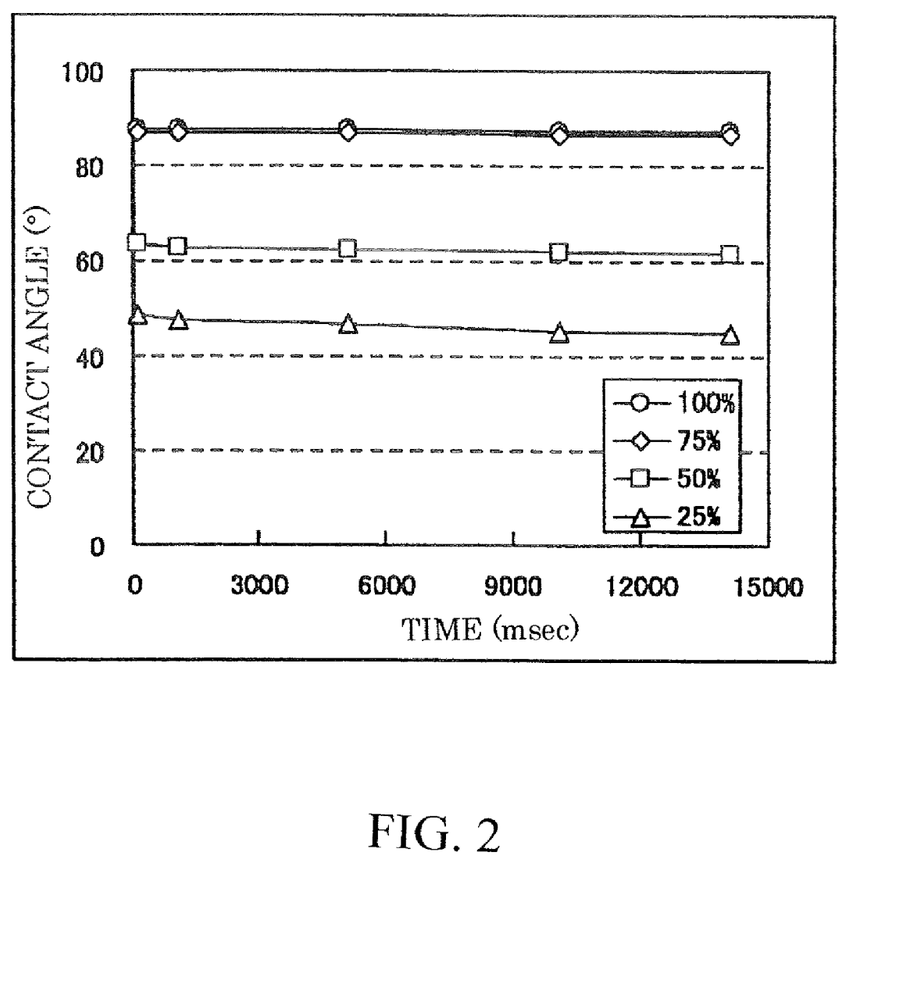
FIG. 2 is a diagram showing a relationship between time and water contact angles on the printing plate member B.

FIG. 2 shows variation with time (through 14,000 msec) of the water contact angles at a portion with 25% printing rate, a portion with 50% printing rate, a portion with 75% printing rate, and a portion with 100% printing rate of the printing plate member B, respectively.

As apparent from FIG. 2, the higher printing rate portion (portion with printing ink adhered thereto) exhibits the higher water repellency, so as to achieve a strong contrast of hydrophobic/hydrophilic properties between the higher printing rate portion and the lower printing rate portion (portion with little or no printing ink adhered thereto). The variation with time of the water contact angle was slight. It was found from this phenomenon that the water repellency of the printing plate member B can be maintained. That is, the ink penetration to the print media can be efficiently prevented.

Evaluation of Solvent Ink of Example 3

A printing plate member C was obtained in the same manner as Example 1 except that the solvent ink of Example 3 was used.

The printing plate member C was observed under the optical microscope (450× magnification), with the result that an ink coating formed on the printing plate member was confirmed. In addition, the water contact angle of a printed portion (printing rate: 100%) was measured, with the result that the water contact angle of the printed portion was 85°.

As the offset printing was conducted in the same manner as Example 1 except that the printing plate member C was used, initial 4000 pieces of printed matter were outputted with good dot reproducibility. However, half-tone portions of printed matter between 4,000th and 5,000th were slightly blurred.

Figure 3:
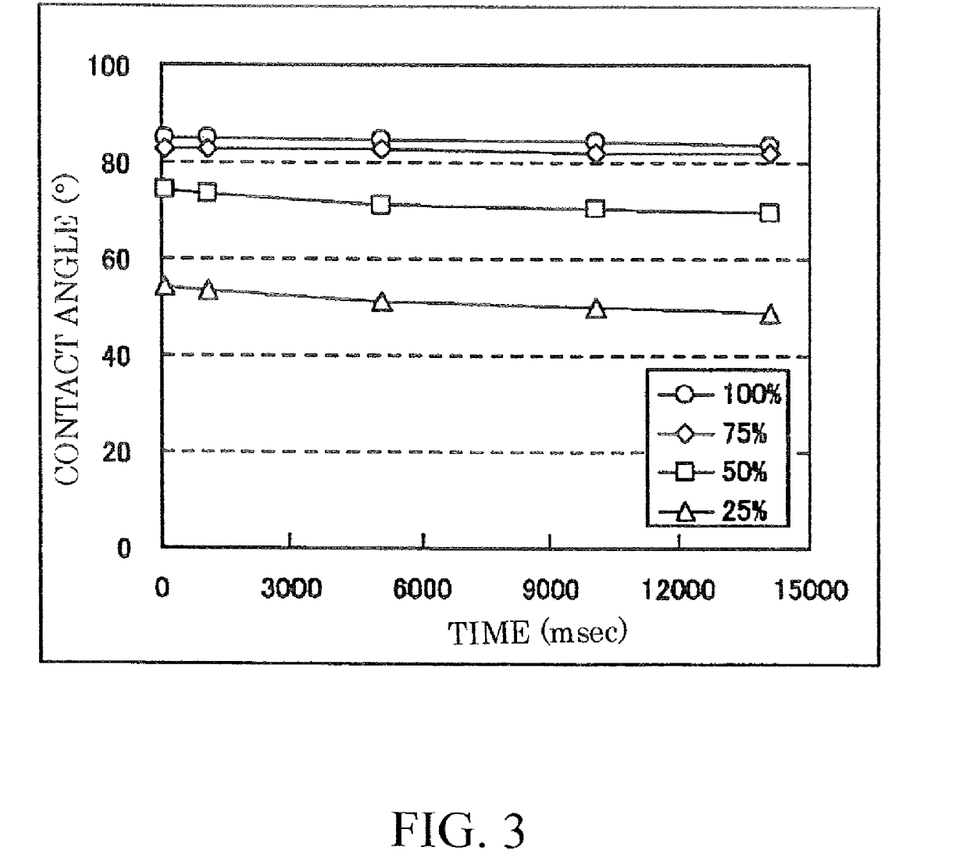
FIG. 3 is a diagram showing a relationship between time and water contact angles on the printing plate member C.

FIG. 3 shows variation with time (through 14,000 msec) of the water contact angles at a portion with 25% printing rate, a portion with 50% printing rate, a portion with 75% printing rate, and a portion with 100% printing rate of the printing plate member C, respectively.

As apparent from FIG. 3, the higher printing rate portion (portion with printing ink adhered thereto) exhibits the higher water repellency, so as to achieve a strong contrast of hydrophobic/hydrophilic properties between the higher printing rate portion and the lower printing rate portion (portion with little or no printing ink adhered thereto). The variation with time of the water contact angle was slight. It was found from this phenomenon that the water repellency of the printing plate member C can be maintained. That is, the ink penetration to the print media can be efficiently prevented.

Evaluation of Solvent Ink of Comparative Example 1

A printing plate member D was obtained in the same manner as Example 1 except that the solvent ink of Comparative Example 1 was used.

The printing plate member D was observed under the optical microscope (450× magnification), with the result that an ink coating formed on the printing plate member was not confirmed. In addition, the water contact angle of a printed portion (printing rate: 100%) was measured, with the result that the water contact angle of the printed portion was 48°.

As the offset printing was conducted in the same manner as Example 1 except that the printing plate member D was used, half-tone portions of printed matter were blurred from the start of the printing.

Figure 4:
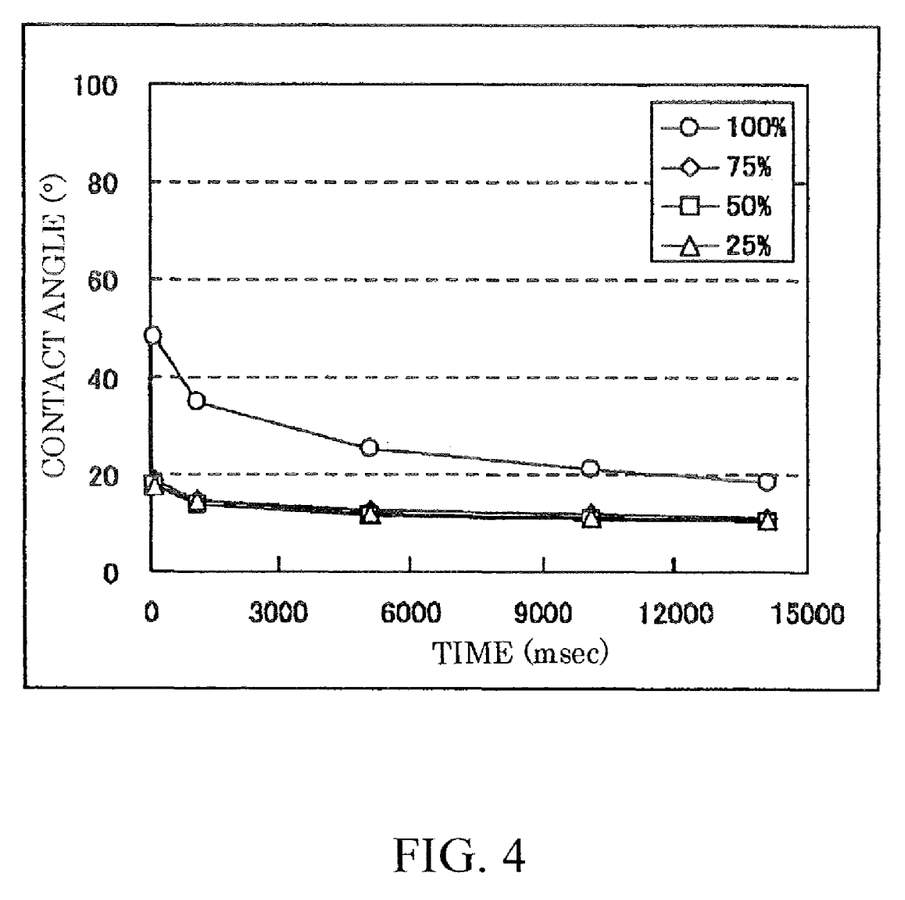
FIG. 4 is a diagram showing a relationship between time and water contact angles on the printing plate member D.

FIG. 4 shows variation with time (through 14,000 msec) of the water contact angles at a portion with 25% printing rate, a portion with 50% printing rate, a portion with 75% printing rate, and a portion with 100% printing rate of the printing plate member D, respectively.

As apparent from FIG. 4, the water contact angles of the printing plate member D are wholly small. This means that the printing plate member D does not have water repellency enough for offset printing. Since the water contact angle is decreased due to variation with time, it was found that the water repellency of the printing plate member D can not be maintained. That is, ink was allowed to penetrate into the print medium.

Evaluation of Solvent Ink of Comparative Example 2

A printing plate member E was obtained in the same manner as Example 1 except that the solvent ink of Comparative Example 2 was used.

The printing plate member E was observed under the optical microscope (450× magnification), with the result that an ink coating formed on the printing plate member was not confirmed. In addition, the water contact angle of a printed portion (printing rate: 100%) was measured, with the result that the water contact angle of the printed portion was 69°.

As the offset printing was conducted in the same manner as Example 1 except that the printing plate member E was used, half-tone portions of printed matter were blurred from the start of the printing.

Figure 5:
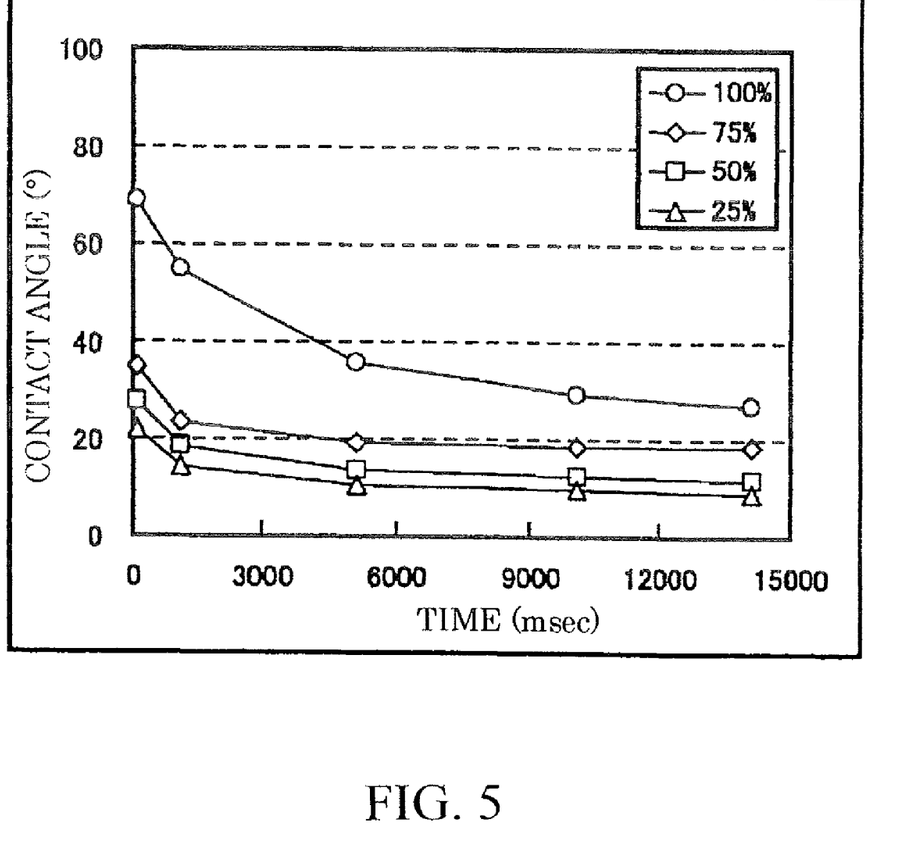
FIG. 5 is a diagram showing a relationship between time and water contact angles on the printing plate member E.

FIG. 5 shows variation with time (through 14,000 msec) of the water contact angles at a portion with 25% printing rate, a portion with 50% printing rate, a portion with 75% printing rate, and a portion with 100% printing rate of the printing plate member E, respectively.

As apparent from FIG. 5, the water contact angles of the printing plate member E are wholly small. This means that the printing plate member E does not have water repellency enough for offset printing. Since the water contact angle is decreased due to variation with time, it was found that the water repellency of the printing plate member E can not be maintained. That is, ink was allowed to penetrate into the print medium.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A solvent ink for an inkjet printer comprising:
   a solvent; and
   a penetration inhibitor consisting of only a rosin-series resin having weight-average molecular weight of at least about 16,000 and at most about 50,000,
   wherein said solvent ink does not include any polymer resin component other than said rosin-series resin, and
   wherein said solvent ink has a viscosity of from 3 to 15 mPa·S.

2. The solvent ink as claimed in claim 1, wherein said rosin-series resin comprises a rosin-modified phenolic resin.

3. The solvent ink as claimed in claim 1, wherein said rosin-series resin having weight-average molecular weight of at least about 25,000 and at most about 40,000.

4. The solvent ink as claimed in claim 1, wherein said solvent ink includes said rosin-series resin in an amount of at least about 5% and at most about 25% by mass with respect to a total mass amount of said solvent ink.

5. A method for producing solvent ink for an inkjet printer, the method comprising:
   providing a solvent; and
   adding a rosin-series resin having weight-average molecular weight of at least about 16,000 and at most about 50,000 into the solvent,
   wherein said solvent ink does not include any polymer resin component other than said rosin-series resin, and
   wherein said solvent ink is adjusted to have a viscosity of from 3 to 15 mPa·S.

6. The method as claimed in claim 5, wherein said rosin-series resin is added to said solvent ink in an amount of at least about 5% and at most about 25% by mass with respect to a total mass amount of said solvent ink.

7. The method as claimed in claim 5, wherein said rosin-series resin comprises a rosin-modified phenolic resin.

8. The method as claimed in claim 5, wherein said rosin-series resin having weight-average molecular weight of at least about 25,000 and at most about 40,000.

9. The method as claimed in claim 5, wherein said rosin-series resin is added to said solvent ink in an amount of at least about 10% and at most about 20% by mass with respect to a total mass amount of said solvent ink.

10. The method as claimed in claim 5, wherein a colorant is added to said solvent ink, and wherein said colorant is from 0.1 to 15% by mass relative to a total amount of the solvent ink.

11. The solvent ink as claimed in claim 1, wherein said solvent ink includes said rosin-series resin in an amount of at least about 10% and at most about 20% by mass with respect to a total mass amount of said solvent ink.

12. The solvent ink as claimed in claim 1, further comprising a colorant, wherein said colorant is from 0.1 to 15% by mass relative to a total amount of the solvent ink.

13. The solvent ink as claimed in claim 1, wherein said solvent ink has a surface tension of from about 20 to 35 mN/m.

14. The method as claimed in claim 5, wherein said solvent ink is adjusted to have a surface tension of from about 20 to 35 mN/m.

* * * * *